US008918765B2

(12) United States Patent
Dearman et al.

(10) Patent No.: US 8,918,765 B2
(45) Date of Patent: Dec. 23, 2014

(54) AUTO-DOCUMENTING BASED ON REAL-TIME ANALYSIS OF CODE EXECUTION

(75) Inventors: Michael Dearman, Lakewood, NY (US); Albert Cecchini, Jamestown, NY (US)

(73) Assignee: Libera, Inc., Jamestown, NY (US)

( * ) Notice: Subject to any disclaimer, the term of this patent is extended or adjusted under 35 U.S.C. 154(b) by 513 days.

(21) Appl. No.: 13/164,450

(22) Filed: Jun. 20, 2011

(65) Prior Publication Data

US 2012/0159442 A1 Jun. 21, 2012

Related U.S. Application Data

(60) Provisional application No. 61/398,268, filed on Jun. 18, 2010.

(51) Int. Cl.
*G06F 9/44* (2006.01)
*G06F 11/30* (2006.01)
*G06F 11/36* (2006.01)

(52) U.S. Cl.
CPC ........ *G06F 11/3089* (2013.01); *G06F 11/3612* (2013.01); *G06F 11/3636* (2013.01); *G06F 8/73* (2013.01); *G06F 11/302* (2013.01)
USPC ............................. 717/130; 717/127; 717/124

(58) Field of Classification Search
None
See application file for complete search history.

(56) References Cited

U.S. PATENT DOCUMENTS

| | | | | |
|---|---|---|---|---|
| 4,931,928 A | * | 6/1990 | Greenfeld | 717/131 |
| 5,367,670 A | * | 11/1994 | Ward et al. | 714/47.2 |
| 5,408,650 A | * | 4/1995 | Arsenault | 717/124 |
| 5,452,206 A | * | 9/1995 | Turrietta et al. | 715/236 |
| 5,475,843 A | * | 12/1995 | Halviatti et al. | 717/124 |
| 6,126,330 A | * | 10/2000 | Knight | 717/127 |
| 6,144,967 A | * | 11/2000 | Nock | 1/1 |
| 6,295,643 B1 | * | 9/2001 | Brown et al. | 717/148 |
| 6,601,234 B1 | * | 7/2003 | Bowman-Amuah | 717/108 |
| 6,701,514 B1 | * | 3/2004 | Haswell et al. | 717/124 |
| 6,865,580 B1 | * | 3/2005 | Bush | 717/116 |
| 6,907,546 B1 | * | 6/2005 | Haswell et al. | 717/124 |
| 7,062,756 B2 | * | 6/2006 | Kamen et al. | 717/127 |
| 7,359,915 B1 | * | 4/2008 | Bush | 1/1 |
| 7,451,455 B1 | * | 11/2008 | El-Haj | 719/320 |
| 7,627,861 B2 | * | 12/2009 | Smith et al. | 717/144 |

(Continued)

OTHER PUBLICATIONS

Nilsson, et al., "Natural language Parsing for Fact Extraction from Source Code", 2009 IEEE; [retrieved on May 5, 2014]; Retrieved from Internet <URL:http://ieeexplore.ieee.org/stamp/stamp.jsp?tp=&arnumber=5090046>; pp. 223-227.*

(Continued)

*Primary Examiner* — Xi D Chen
(74) *Attorney, Agent, or Firm* — Baker & Hostetler LLP

(57) ABSTRACT

Methods and systems for providing a monitoring center with sensors that are inserted at one or more locations within an operating framework software engine. The sensors monitor the interpretive framework engine's process of loading commands, combining variables with coded commands, and executing commands with event processing, variable values, and user interactions. The sensors watch and gather information that has been deemed relevant by the monitoring center's configuration and pass that information to the center so that storage functions can route the information to the appropriate data storage locations. Alternatively, each sensor can be self-contained providing monitoring, gathering, processing, data transmission, and storage within the sensor.

43 Claims, 8 Drawing Sheets

(56) References Cited

U.S. PATENT DOCUMENTS

| | | | |
|---|---|---|---|
| 7,703,106 B2* | 4/2010 | Eschenroeder et al. | 719/320 |
| 7,721,263 B2* | 5/2010 | Swoboda | 717/124 |
| 7,721,267 B2* | 5/2010 | Agarwala | 717/130 |
| 7,784,027 B2* | 8/2010 | Harrison | 717/113 |
| 7,788,640 B2* | 8/2010 | Grimaldi | 717/123 |
| 7,788,645 B2* | 8/2010 | Agarwala | 717/130 |
| 7,797,685 B2* | 9/2010 | Agarwala et al. | 717/130 |
| 7,797,686 B2* | 9/2010 | Agarwala et al. | 717/127 |
| 7,861,158 B2* | 12/2010 | Martin et al. | 715/243 |
| 7,958,486 B2* | 6/2011 | Tsyganskiy et al. | 717/105 |
| 8,079,020 B2* | 12/2011 | Chilimbi et al. | 717/130 |
| 8,141,073 B2* | 3/2012 | Bhandari et al. | 717/174 |
| 8,181,167 B2* | 5/2012 | Zhao | 717/143 |
| 8,495,100 B2* | 7/2013 | Cheung | 707/794 |
| 8,561,028 B1* | 10/2013 | Zuckerman | 717/130 |
| 8,572,581 B2* | 10/2013 | Shafi et al. | 717/127 |
| 8,726,394 B2* | 5/2014 | Maor et al. | 717/124 |
| 8,745,597 B2* | 6/2014 | Kandasamy et al. | 717/127 |
| 8,769,497 B2* | 7/2014 | Welchman | 717/127 |
| 8,826,244 B2* | 9/2014 | Kandasamy et al. | 717/127 |
| 2002/0029231 A1* | 3/2002 | Aptus et al. | 707/513 |
| 2002/0059348 A1* | 5/2002 | Lee et al. | 707/516 |
| 2005/0193376 A1* | 9/2005 | Harrison | 717/127 |
| 2006/0036989 A1* | 2/2006 | Chaudhuri et al. | 717/101 |
| 2006/0253840 A1* | 11/2006 | Cruickshank et al. | 717/127 |
| 2007/0168990 A1* | 7/2007 | Alshab et al. | 717/127 |
| 2007/0234308 A1* | 10/2007 | Feigenbaum et al. | 717/130 |
| 2011/0161934 A1* | 6/2011 | Thomson et al. | 717/125 |

OTHER PUBLICATIONS

Brown, et al., "Step: a Framework for the Efficient Encoding of General Trace Data"; 2002 ACM; [retrieved on Sep. 4, 2014]; Retrieved from Internet <URL: http://dl.acm.org/citation.cfm?id=586094>; pp27-34.*

Sridhar, et al., "HDTrans: An Open Source, Low-Level Dynamic Instrumentation System"; 2006 ACM; [retrieved on Sep. 4, 2014]; Retrieved from Internet <URL: http://dl.acm.org/citation.cfm?id=1134760>; pp175-185.*

Nagappan, Wu, "Efficiently Extracting Operational Profiles from Execution Logs using Suffix Arrays"; 2009 IEEE; [retrieved on 9-Apr. 2014]; Retrieved from Internet <URL: http://ieeexplore.ieee.org/stamp/stamp.jsp?tp=&arnumber=5362080>; pp41-50.*

Jiang, et al., "Abstracting Execution Logs to Execution Events for Enterprise Applications"; 2008 IEEE; [retrieved on Sep. 4, 2014]; Retrieved from Internet <URL: http://ieeexplore.ieee.org/stamp/stamp.jsp?tp=&arnumber=4601543>; pp181-186.*

* cited by examiner

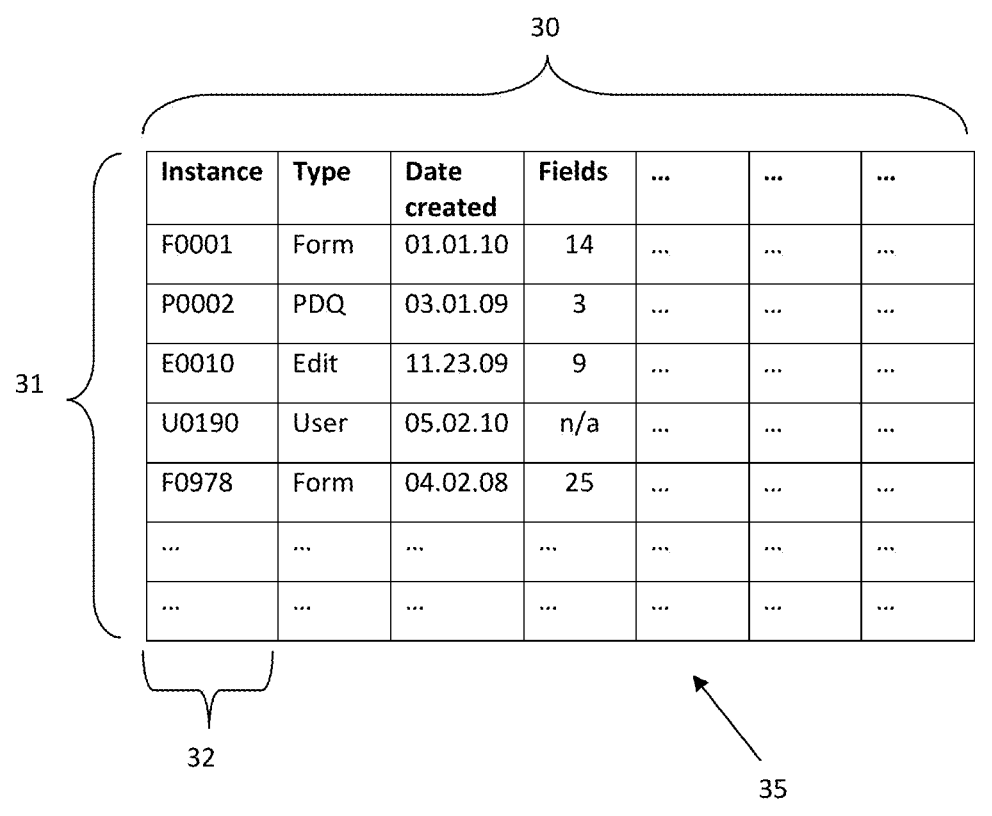

| Instance | Type | Date created | Fields | ... | ... | ... |
|---|---|---|---|---|---|---|
| F0001 | Form | 01.01.10 | 14 | ... | ... | ... |
| P0002 | PDQ | 03.01.09 | 3 | ... | ... | ... |
| E0010 | Edit | 11.23.09 | 9 | ... | ... | ... |
| U0190 | User | 05.02.10 | n/a | ... | ... | ... |
| F0978 | Form | 04.02.08 | 25 | ... | ... | ... |
| ... | ... | ... | ... | ... | ... | ... |
| ... | ... | ... | ... | ... | ... | ... |

FIG. 3

| RowID | Component | ParentRowID | Item | Element | Attribute | Value | Linked Type | Linked Component |
|---|---|---|---|---|---|---|---|---|
| 10 | 30021 | | Data Source | datasource | | Orders | | |
| 11 | 30021 | 10 | Form Field | textfield | | Orders.CustomerName | | |
| 12 | 30021 | 11 | Title | textfield | title | Customer Name | | |
| 13 | 30021 | 11 | Field Reference | textfield | fieldref | Orders.CustomerName | | |
| 14 | 30021 | 11 | DB Column | | column | CustomerName | | |
| 15 | 30021 | 14 | Table | | table | Orders | | |
| 16 | 30021 | 14 | Column DataType | | datatype | nvarchar | | |
| 17 | 30021 | 14 | Column MaxLength | | size | 100 | | |
| 18 | 30021 | 11 | Read-only? | textfield | readonly | FALSE | | |
| 19 | 30021 | 11 | Lookup | lookup | | PDQ 100231 | | |
| 20 | 30021 | 19 | Pdq | lookup | pdq | 100231 | PDQ | 100231 |

FIG. 5

AUTO-DOCUMENTING BASED ON REAL-TIME ANALYSIS OF CODE EXECUTION

CROSS REFERENCE TO RELATED APPLICATION

The present application claims priority to U.S. Provisional Patent Application No. 61/398,268, filed Jun. 18, 2010. The contents of that application are hereby incorporated by reference.

TECHNICAL FIELD

The present invention relates to automated methods and systems for documenting framework-based computer applications.

BACKGROUND

There are many manners for documenting framework-based computer applications, whether using an automated or manual system. For example, in the waterfall model, where the development process is sequential, it is typical to document job requirements, specifications, and other software design needs at the beginning of development, usually after necessary requirements have been gathered. Then, following the requirements gathering, the development proceeds with design, implementation, testing, and finally maintenance. Such a development model lends itself to straightforward projects that are designed prior to actual coding. This is not the case when the requirements and the design of the computer application are constantly in flux and not known prior to the implementing the application. In such situations, a cyclic prototyping software development process with iterative development and reviews is more appropriate, and system requirements are typically created after the iterative process is complete. Automating documentation, such as automating specification drafting and report generation, is more practical than manual documentation when requirements and design of a computer application are in flux and/or unknown prior to implementation.

The automation of documentation in a development cycle is well known in the field of computer science. However, systems for automating documentation in an iterative development process specifically for framework-based applications are rare and typically limited to applications that analyze static code. Usually, solutions are merely translators that examine static source code syntax and static values and translate them into a natural language such as English. (For the purposes of this disclosure natural language is any spoken or written language that is not a computer programming language.) A solution is needed to further document the affects of a framework on the static source code when the interpretive framework engine translates the code and its filled variables into an interactive computer application with dynamic user interactions under varied conditions. This would provide a new dimension in automated documentation that could act as a stand-alone auto-documentation approach or one that could be used in conjunction with static code documenters known in the art.

SUMMARY

The invention relates to methods and systems that do not merely translate source code into a readable document for a layperson, but rather facilitate documenting the affects of a framework on the static source code when an interpretive framework engine translates the code and its variables into an interactive computer application with dynamic user interactions under varied conditions. By collecting, processing, and storing attributes of a computer application while it is being interpreted and executed by an interpretive framework engine, attributes of the computer application that are not necessarily apparent in mere source code are retrievable for automated documentation. The resulting data that is collected and stored in a database by the novel methods and systems enables other tools known in the art to process the dynamically retrieved data for the purposes of producing user documentation, including: system specifications based on the dynamics of the application while under user control, a history of requirements changes, and documentation on the many other affects of the interpretive engine while processing an application. Such methods and systems lend themselves to ease of documenting during the various stages of an iterative development cycle.

The methods and systems presented herein can be conceptualized as a monitoring center with sensors that are inserted at one or more locations within an operating framework software engine. The sensors monitor the interpretive framework engine's process of loading commands, combining variables with coded commands, and executing commands with event processing, variable values, and user interactions. The sensors watch and gather information that has been deemed relevant by the monitoring center's configuration and pass that information to the center so that storage functions can route the information to the appropriate data storage locations. Alternatively, in another embodiment, each sensor can be self-contained providing monitoring, gathering, processing, data transmission, and storage within the sensor.

In a preferred embodiment, the methods and systems of the invention are represented by computer readable instructions that a processor executes. The instructions are possibly part of or linked to the interpretive framework engine. In one embodiment, the instructions are integrated with static code translators known in the art.

In another embodiment of the methods and systems of the invention, computer memory contains executable code, where the executable code represents specific objects that facilitate the methods and systems of the invention. Preferably, the specific objects are objects for collecting, processing, and storing attributes of a framework-based computer application while the framework is interpreting the application. In an embodiment, the specific objects facilitate storing the attributes in a database and it is preferred that data representing the attributes is stored in at least one database table of a database. Whether the attributes are stored in a relational database or another type of data structure, the attributes after being processed and stored are readily accessible for automatic processes related to various stages of a development cycle, such as automatic documentation, error checking, version control, and report generation.

In exemplary embodiments, the methods and systems of the invention implement the steps of collecting attributes of a computer application while the application is being interpreted by an interpretive framework engine; processing the attributes; and storing the processed attributes in a data structure. Furthermore, the methods and systems of the invention may also encompass systems that combine the methods and systems described herein with known methods and systems that merely translate source code into documentation. In such a combination, the information retrieved from the novel and known methods and systems together provide for more thorough documentation than if either technique is used on its own. In either case, information on the attributes is stored in a data structure and is readily retrievable by automated processes.

The invention also includes software elements including instructions and other software processing means that when executed by a processor of a computer system cause the processor to implement the methods of the invention. The invention further includes computer readable storage media that stores instructions that when executed by a processor cause the processor to implement the methods of the invention. Such systems and computer readable storage media are also within the scope of the invention described herein.

BRIEF DESCRIPTION OF THE DRAWINGS

FIG. 3 illustrates an example database table implemented by an embodiment of the methods and systems of the invention.

FIG. 5 illustrates a further example database table implemented by an embodiment of the methods and systems of the invention.

DETAILED DESCRIPTION OF ILLUSTRATIVE EMBODIMENTS

Example methods for overcoming the above-described disadvantages associated with prior art software documentation systems are described below.

Figure 1:
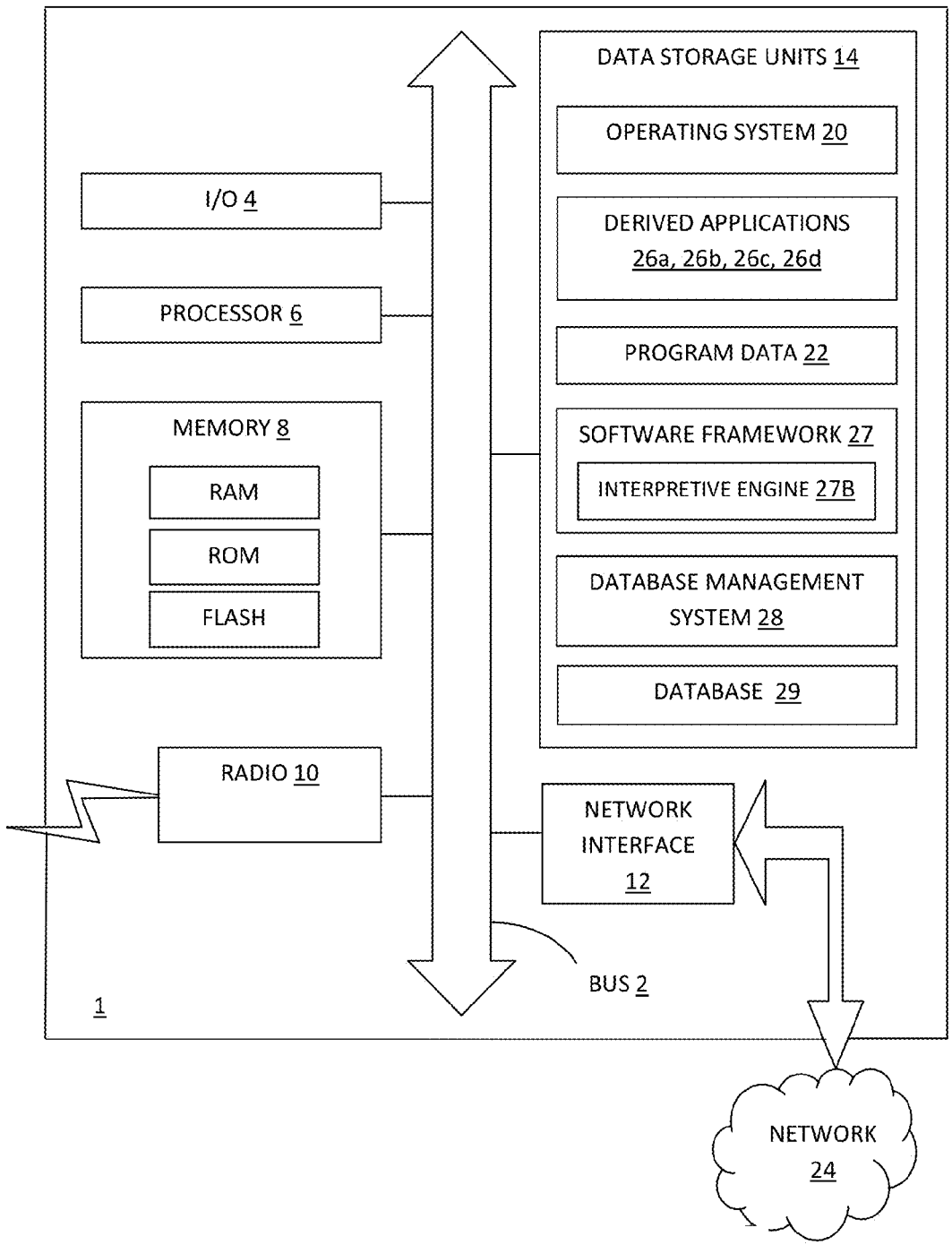
FIG. 1 illustrates a block diagram of an exemplary computer system for implementing an embodiment of the methods and systems of the invention.
Figure 2:
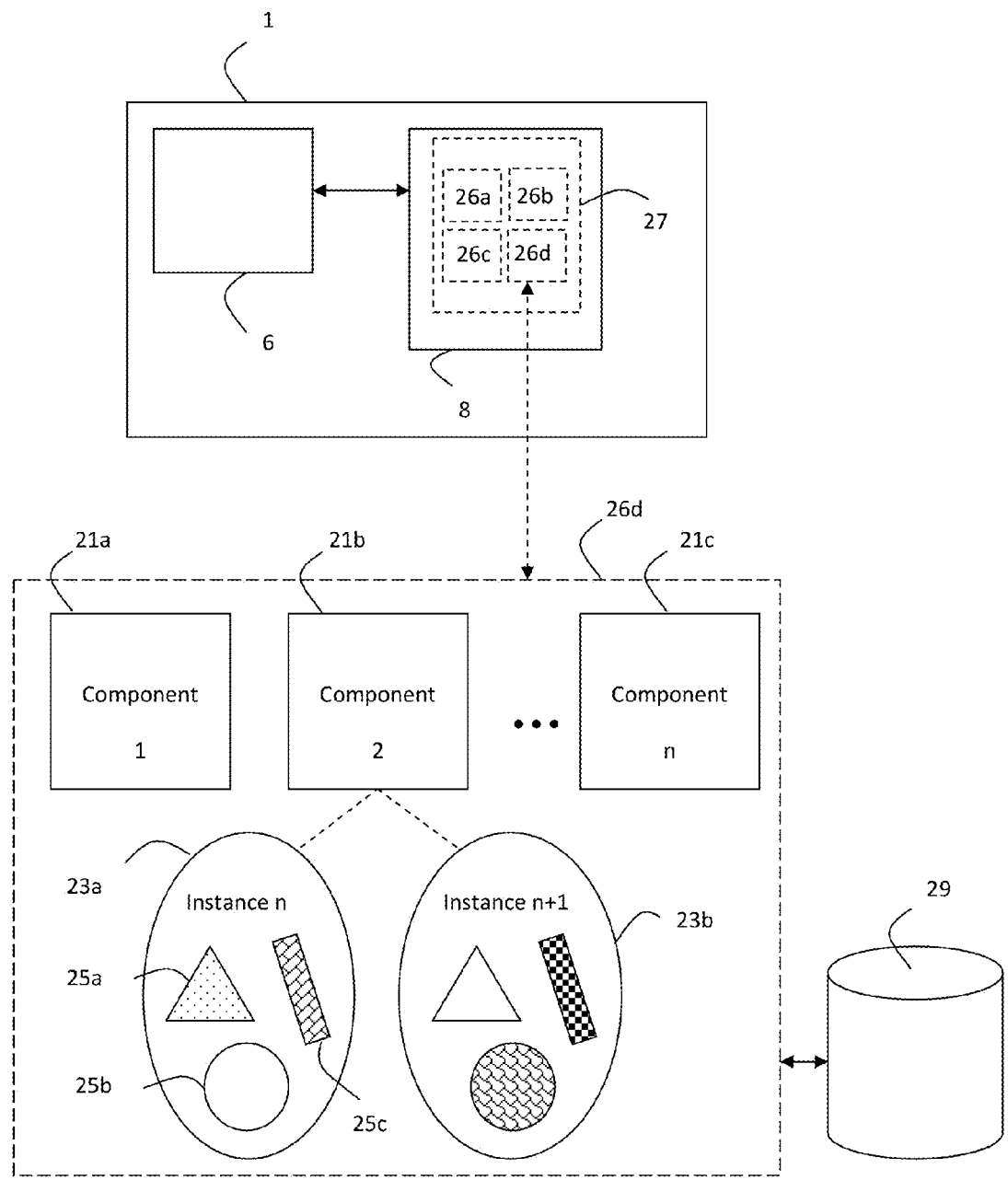
FIG. 2 illustrates a block diagram of an exemplary computer system for implementing an embodiment of the methods and systems of the invention that further depicts the interaction between classes, instances, and attributes of a framework and a computer application derived from the framework and the interpretive engine of the framework.

FIG. 1 illustrates an example computing system for implementing an embodiment of the methods and systems of the invention. FIG. 1 includes a computer 1 running software, such as a software framework 27, a database management system 28, and one or more computer applications (i.e. the framework-based computer applications) 26a, 26b, 26c, & 26d derived from the software framework 27 and an interpretive engine 27B of the software framework 27. Though one computer is depicted in FIG. 1, the administrative systems are preferably implemented by multiple computers having similar elements to the computer of FIG. 1. In the case of multiple computers, it is preferred that at least one computer hosts the software framework 27 and the derived applications 26a, 26b, 26c, & 26d and at least one other computer hosts the database management system 28. As illustrated, the computer 1 includes a processor 6 in communication with a computer readable storage medium, where the computer readable storage medium is any medium that that stores information for retrieval later by the processor 6. Computer readable storage medium includes memory 8 and data storage units 14. Memory 8 is possibly a fast-access memory and is used to run program instructions executable by the processor 6. Memory 8 is possibly random access memory (RAM), read only memory (ROM), and/or flash memory. Data storage units 14 are physical devices and are used to store any data and instructions that may be accessed by the processor 6, such as program data 22 and instructions for an operating system 20, the software framework 27 and the derived applications 26a, 26b, 26c, & 26d, and the database management system 28. Data storage units 14 and their associated computer readable storage medium provide storage of computer readable instructions and data. Such storage units 14 also provide storage for data structures including a database 29 with database tables which are managed by the database management system 28 and program modules such as classes for components of the framework 21a, 21b & 21c having objects 23a & 23b having attributes 25a, 25b, & 25c (FIG. 2). Data storage units 14 are possibly an optical medium, a magnetic medium such as a floppy disk, a compact disc (CD), a digital video disk (DVD), and/or a solid-state medium such as RAM, ROM, and flash memory.

Preferably, the computer 1 operates in a networked environment using logical connections to other computers and communication devices via a network 24. The computer 1, the other computers, and communication devices are possibly a personal computer, a server, a router, a network PC, a peer device, or other common network nodes. When used in a LAN or WLAN networking environment, the computer 1 is connected to the other computers and the communication devices via the LAN or WLAN through a network interface 12. The computer 1 also includes a radio 10 or another type of communications device for wirelessly transmitting and receiving data.

The computer 1 includes input/output devices 4 for providing input to the processor 6, the memory 8, the radio 10, the storage units 14, the network interface 12, and other electrical components of the computer 1. Output devices 4 provide output of the electrical components of the computer 1 to other electrical components of the computer 1 and to a user of the computer 1. For example, a display device provides output of the electrical components to a user. A bus 2 and other circuitry assist in connecting the input/output devices (I/O) 4 to various electrical components of the computer 1. The electrical components of the computer, the bus 2, and the circuitry are hardware, software, firmware, or a combination thereof.

FIG. 2 illustrates an example computing system for implementing an embodiment the novel methods and systems of the invention that further depicts the interaction between classes, instances, and attributes of the framework and the computer applications derived from the framework. FIG. 2 depicts the computer 1 of FIG. 1 including the processor 6 coupled to the computer memory 8 configured to execute computer-executable instructions 27 temporarily stored in the computer memory 8. The computer-executable instructions enable elements of a software framework 27 and the derived applications 26a, 26b, 26c, & 26d that include: software framework components 21a, 21b, & 21c, which are represented by classes of the software framework; software framework component objects (e.g. 23a & 23b), which are instances of software framework component classes (e.g. 21b); and attributes (e.g. 25a, 25b, & 25c) of the software framework component objects (e.g. 23a), which are typically held in instance variables or member variables within an instance of a software framework component object. In FIG.

2, a database 29, which is coupled to the software framework 27 and the derived applications 26a, 26b, 26c, & 26d, stores the attributes (e.g. 25a, 25b, & 25c) of the software framework component objects (e.g. 23a).

As mentioned previously, the methods and systems of the invention collect and process attributes and events of a software framework and derived applications by instantiating an instance of a particular class for processing and collecting attributes, which is referred to as the attribute-collecting-and-populating sensor object of an attribute-collecting-and-populating sensor class. The instance of the attribute-collecting-and-populating sensor class also facilitates populating a data structure with the attributes while the framework engine is running and actively interpreting and executing the static code. The attribute-collecting-and-populating sensor object facilitates populating the database by: being interjected into and then traversing code of the software framework and any software system that is interpreted by (including framework-based computer applications), interacts with, or is related to the software framework; collecting data in the code that represents the attributes that are changing in response to its execution by the framework's interpretive engine; and then populating data structures, such as database tables, with the collected data. Where the code is extensible markup language (XML), the attribute-collecting- and populating sensor object collects attributes at each node of the XML and in turn relays that information to a central system that in turn uses functions to interpret and then translates and stores the collected attributes and event information to a data structure. Preferably, the central system includes a user interface to configure which attributes and events to interpret and store in the data structure. The user interface may also configure the attribute-collecting-and-populating sensor objects to collect only certain types of attributes and events.

In one embodiment of the methods and systems of the invention, the attribute-collecting- and populating objects are part of the framework's interpretive engine or interacts with the framework's interpretive engine (such as the computer readable instructions of the objects are linked to the interpretive engine from an object outside the interpretive engine), and these objects traverse the code while the interpretive engine is actively interpreting the code. For example, these objects traverse code of a derived application of the framework while such code is being interpreted by the framework into an active application.

In an embodiment of the attribute-collecting-and-populating sensor object, the object includes a method for bypassing programmed conditional logic in the code of the software framework and any software system that is derived from, interacts with, or is related to the software framework. Such a bypass allows any attribute to be collected under any situation. Without such a method, in the normal course of events or in a batch-process, the attribute-collecting-and-populating sensor object would only be able to reach a particular attribute after a particular condition is met.

Figure 6:
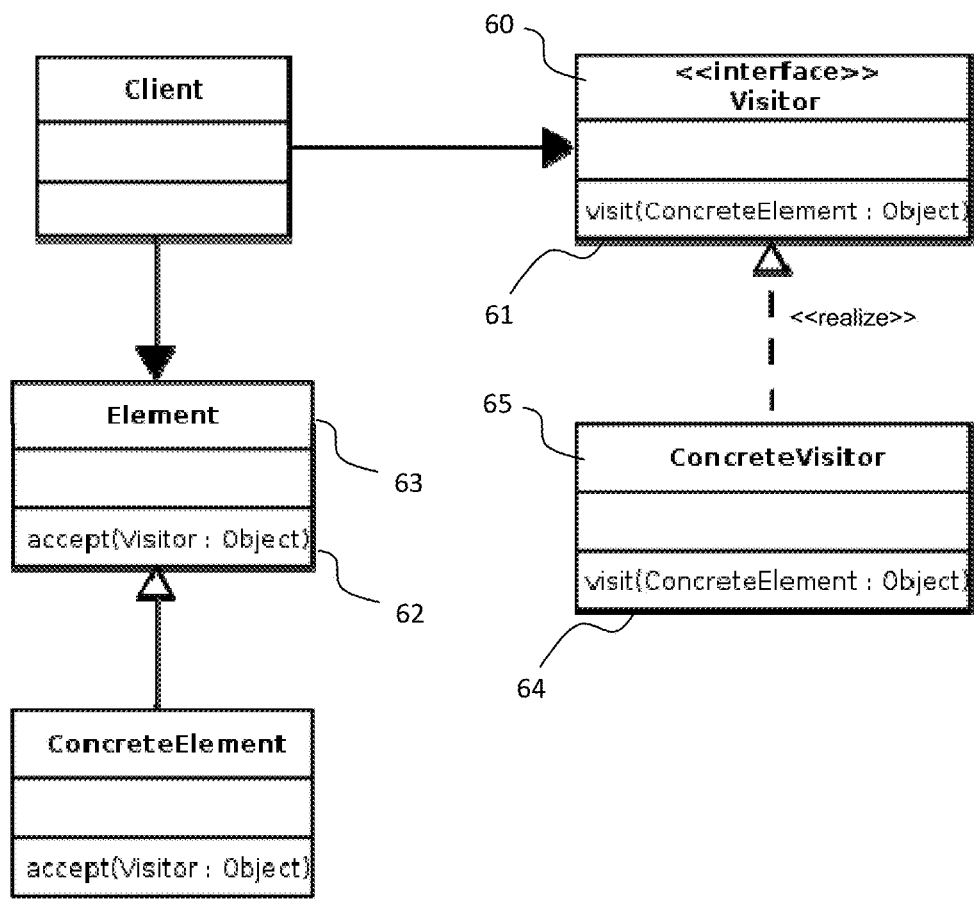
FIG. 6 illustrates a UML diagram of an example visitor design pattern implemented by an embodiment of the methods and systems of the invention.

In an embodiment of the attribute-collecting-and-populating sensor object, the object is an instance of a visitor class, where the visitor class is based on a visitor design pattern. The application of this technique lends itself to the methods and systems of the invention by allowing the attribute-collecting- and-populating sensor object to traverse the code of framework-based computer applications to collect and process attributes of the applications without disturbing the original code of the applications. FIG. 6 illustrates an example visitor design pattern in UML. The illustration of FIG. 6 and the following explanation of FIG. 6 is from a Wikipedia article titled "Visitor Pattern."

As illustrated in FIG. 6, the idea is to use a structure of element classes, each of which has an accept( ) method that takes a visitor object as an argument. Visitor 60 is an interface that has a visit( ) method 61 for each element class. The accept( ) method 62 of an element class 63 calls back the visit( ) method for its class. Separate concrete visitor classes 65 can then be written that perform some particular operations, by implementing these operations in their respective visit( ) methods 64. One of these visit( ) methods of a concrete visitor can be thought of as a method not of a single class, but rather a method of a pair of classes: the concrete visitor and the particular element class. Thus, the visitor pattern simulates double dispatch in a conventional single-dispatch object-oriented language such as C#, Java, Smalltalk, and C++. Because the visitor object has one principal function (manifested in a plurality of specialized methods) and that function is called visit( ) the visitor can be readily identified as a potential function object. Likewise, the accept( ) function can be identified as a function applicator, a mapper, which knows how to traverse a particular type of object and apply a function to its elements. In short, a visitor design pattern is a way of separating an algorithm from an object that it processes, which gives the pattern the ability to add new operations to existing objects without modifying those objects. In other words, the visitor design allows the transport of attributes and methods of one class to a new group of classes without modifying the original class or the new class. The transport is a virtual transport, and methods and attributes are virtual methods and attributes.

In another embodiment of the attribute-collecting-and-populating sensor object, the object is an instance of an event-driven class, where the event-driven class is based on an event-driven architecture (EDA) software architecture pattern. The application of this technique lends itself to the methods and systems of the invention because it allows the attribute-collecting-and-populating sensor object to listen to the building and execution of the framework-based computer applications, while the interpretive engine is facilitating the generation and execution of the applications. EDA, in its basic form, is made of up of an event sender (i.e. agent) and an event receiver (i.e. sink). Sinks are responsible for detecting the event and handling it, whether the handling of the event calls for a response or not. An explanation of the various manners in which events may be handled is beyond the scope of this disclosure. In contrast to the visitor pattern and other design patterns, EDA allows computer systems to be more responsive. The event-driven sensor object collects the events and related attributes of the software framework and any software system that is derived from, interacts with, or is related to the software framework automatically before and after a particular process is performed, such as a particular process performed on an XML node. This functionality is possible because the event-driven object is event-driven in that it is driven by sensor outputs, user actions, messages from other programs or threads, and the like, and any combination thereof. Where an event-driven object is used it is preferred that the event-driven object is an object based on an event-based asynchronous design pattern.

Figure 7:
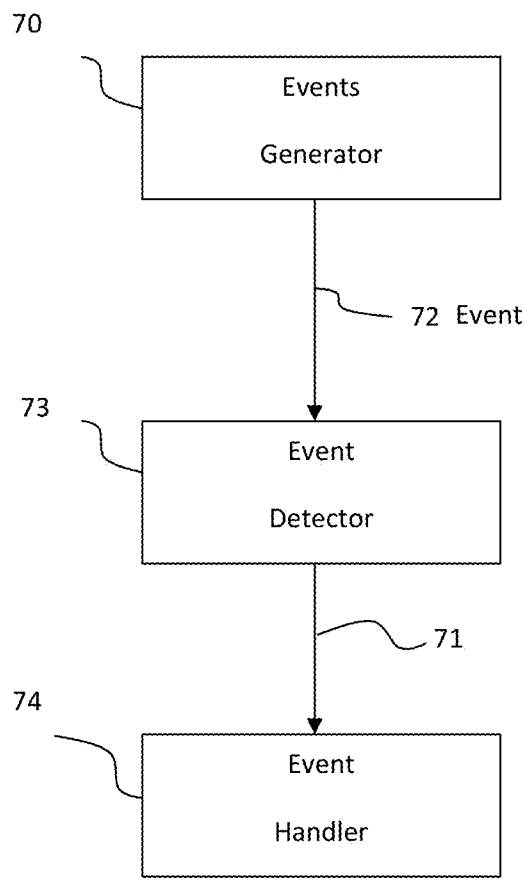
FIG. 7 illustrates a block diagram of an example event-driven pattern implemented by an embodiment of the methods and systems of the invention.

FIG. 7 illustrates an example event-driven pattern used by an embodiment of the methods and systems of the invention. As illustrated, an event generator 70 generates an event 72 that is detected by the event detector (i.e. listener) 73 and then in turn communicates the occurrence of the event 71 to the event handler 74 for further processing of the event.

It is also preferred that the attribute-collecting- and populating sensor object is an instance of a visitor class, which further provides event-driven functionality similar to an event-driven object. The functionality of an event-driven object is typically not possible through a conventional visitor object, because conventionally a visitor object is not event-driven. However, such a combination is possible. The application of such a combination lends itself to the methods and systems of the invention by allowing the attribute-collecting-and-populating sensor object to traverse the code of framework-based computer applications to collect and process attributes of the applications without disturbing the original code of the applications. In addition to not disturbing the original code, this attribute-collecting-and-populating sensor object can listen to the building and execution of the framework-based computer applications, while the interpretive engine is facilitating the generation and execution of the applications. It is also preferred to combine the functionality of these objects with a standard documenter that merely translates static source code, so that an even more complete picture of the computer applications exists for retrieval.

An event-driven visitor object is an instance of an event-driven visitor class that is based on a combination of the visitor design pattern and an EDA software architecture pattern. Like the event-driven object, the event-driven visitor sensor object collects the attributes of the software framework and any software system that is derived from, interacts with, or is related to the software framework automatically before and after a particular process is performed. Where visited code includes XML, the event-driven visitor sensor object collects data representing attributes at each node of the XML and in turn populates a data structure with collected attributes. In an embodiment of the invention, the event-driven visitor object generates events, interprets the events, and then records such events to a database table via an event handler before and after a particular process.

Figure 8:
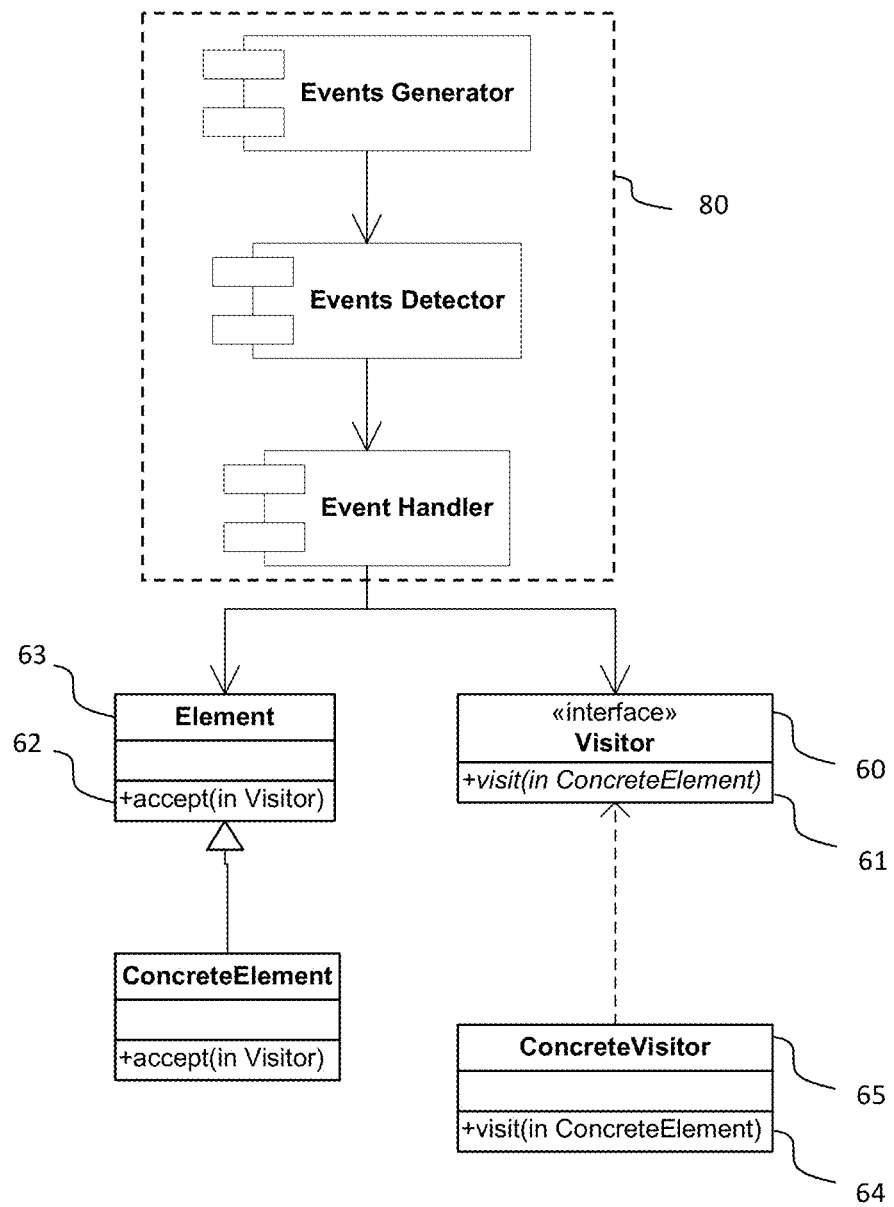
FIG. 8 illustrates an example visitor pattern combined with an event-driven pattern employed by an embodiment of the methods and systems of the invention.

FIG. 8 illustrates an example visitor design pattern combined with an event-driven pattern employed by an embodiment of the administrative systems of the invention. The visitor pattern of FIG. 8 is similar to the visitor pattern of FIG. 6, except the object labeled "Client" is replace by objects and methods of an event driven pattern 80 that is similar to the pattern of FIG. 7. For the most part, the event handler 82 facilitates the communication between objects of the Element Class 63 and the Visitor Interface 60.

As mentioned above, upon collection of the attributes, the specific object that collects and processes the attributes also facilitates populating the attributes into a data structure, such as a database and/or a hierarchal data structure, such as XML. For example, a database 29 stores the attributes of software component objects of the software framework and any software system that is derived from, interacts with, or is related to the software framework. Such attributes include attributes of XML generated by the software framework and attributes derived from and related to attributes of the XML. Attributes derived from attributes of the XML and the software framework component objects provide additional information on relationships between components, objects, and attributes at run-time that would not normally be available within static code. Additionally, the attributes of the software framework component objects are possibly embedded in XML. Attributes preferably include attributes of all levels of abstraction, including attributes of any classes, interfaces, components, objects, instance and member variables, and the like. Alternatively, a database may just store attributes of particular software component object.

In embodiments using a database, where there are one or more database tables, the database tables include rows and columns. Each row represents a record of a component, class, interface, object, instance, instance variable, member variable, or the like. Each column represents a field of the records. The intersection of a row and column is a placeholder to store data for each record, where the data represents attributes of a component, class, interface, object, instance, instance variable, member variable, key to another related table, or the like. Each field possibly has more than one data type to allow for varying record types. Preferably, at least one field of the data structure is used to store version information for tracking a history of changes over time.

FIG. 3 illustrates an example database table 35 implemented by an embodiment of the methods and systems of the invention. FIG. 3 depicts a database table 35 including columns 30, where the columns 30 represent fields that store data representing attributes of the software framework component objects. The table also includes rows 31, where each row represents a software framework component object.

Figure 4:
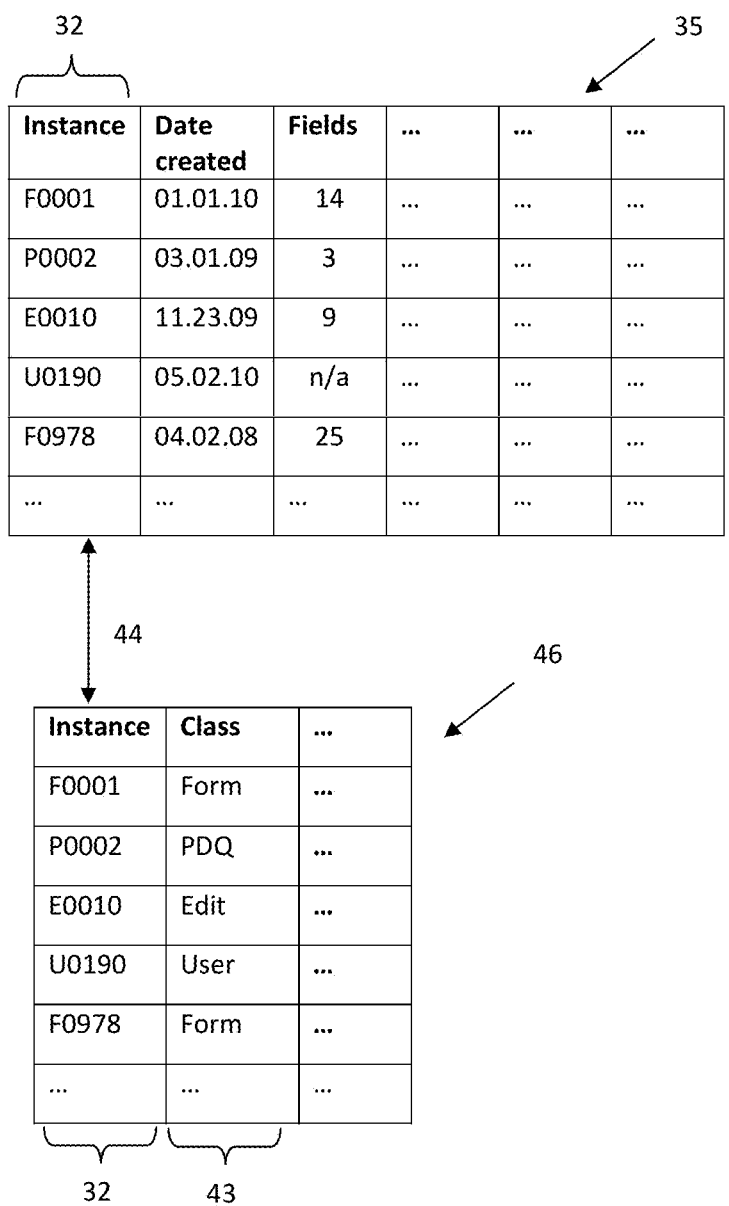
FIG. 4 illustrates another example database table implemented by an embodiment of the methods and systems of the invention.

FIGS. 3 and 4 together illustrate database tables (e.g. 35 & 46) that include a field, labeled "Instance," that stores data for uniquely identifying a software framework component object 32. The "Instance" field 32 links the two database tables 35 & 46 at link 44, where the table 46 includes a field for storing the class of the object 43. FIG. 4 shows how a link 44 allows for using multiple tables as opposed to only using one table for storing the attributes. Preferably, where objects are instances of classes of the software framework, the attributes of component objects including an attribute that identifies a class of an object. The attribute that identifies the class of an object is a unique identifier of a record in a table that stores the attributes of classes. The table that stores class attributes and the table that stores object attributes is possibly the same table; however, it is preferred that there are two tables that are linked, as shown in FIG. 4.

FIG. 5 illustrates an example database table 50 used by an embodiment of the administrative systems of the invention. The table 50 includes fields labeled "RowID" 51, "Component" 52, "ParentRowID" 53, "Item" 54, "Element" 55, "Attribute" 56, "Value" 57, "Linked Type" 58, and "Linked Component" 59. The field labeled "RowID" 51 holds values, where each value represents a unique identification number for an attribute record. The field labeled "Component" 52 holds values, where each value identifies a component of the software framework or software interacting with, related to, or derived from the software framework. The field labeled "ParentRowID" 53 holds values, where each value is a value that identifies a record of a related attribute. For example, the record with "RowID" equal to "14" is related to the record with "RowID" equal to "11" which in turn is related to the record with "RowID" equal to "10." The field labeled "Item" 54 holds values that are descriptions of attributes. The field labeled "Element" 55 holds values that are names of elements from XML generated by the software framework or computer applications derived from the framework. The field labeled "Attribute" 56 holds values that are names from the XML or a derived attribute. The field labeled "Value" 57 holds values that are the values of attributes listed. The field labeled "Linked Type" 58 holds values that represent type of a related software framework component. The field labeled "Linked Component" 59 holds values that are names of software framework components linked to the attribute.

Though various embodiments of the present invention have been described above, it should be understood that embodiments have been presented by way of example, and not limitation. A person of ordinary skill in the art will recognize that there are various changes that can be made to the present invention without departing from the spirit and scope of the present invention. Therefore, the invention should not be limited by any of the above-described example embodiments, but should be defined only in accordance with the following claims and equivalents of the claimed invention.

What is claimed:

1. A computer-implemented method for automated documentation of a computer application, comprising the steps of:
   a processor interjecting attribute-collecting-and-populating sensor objects into source code of a computer application;
   while traversing the source code as the source code is being interpreted by an interpretive framework engine that translates the source code into an interactive computer application, said sensor objects collecting data in the source code that represents the attributes and events of the source code;
   the processor processing the collected attributes and events;
   storing the processed attributes and events in a data structure; and
   generating documentation of the computer application from said stored attributes and events.

2. The method of claim 1, where computer readable instructions for implementing the method are part of the interpretive framework engine.

3. The method of claim 1, further including linking computer readable instructions for implementing the method to the interpretive framework engine from an object outside the interpretive framework engine.

4. The method of claim 1, where collecting of attributes and events of the source code while the source code is being interpreted by the interpretive framework engine includes bypassing programmed conditional logic in the source code.

5. The method of claim 1, where the attributes and events include attributes and events of software framework component objects that represent aspects of the source code.

6. The method of claim 1, where storing the processed attributes and events in a data structure comprises the attribute-collecting-and-populating sensor objects populating the data structure with the collected data.

7. The method of claim 1, where the source code includes extensible markup language, the attribute-collecting-and-populating sensor objects collecting data representing the attributes at each node of the extensible markup language.

8. The method of claim 7, the attribute-collecting-and-populating sensor objects collecting the data representing the attributes before and after a particular process is performed on each respective node of the extensible markup language.

9. The method of claim 1, where the attribute-collecting-and-populating sensor objects are visitor objects of a visitor class.

10. The method of claim 1, where the attribute-collecting-and-populating sensor objects are event-driven objects of an event-driven class.

11. The method of claim 1, where the attribute-collecting-and-populating sensor objects are a combination of a visitor object of a visitor class and an event-driven object of an event-driven class.

12. The method of claim 9, where the visitor objects further provide event-driven functionality similar to an event-driven object.

13. The method of claim 1, where the data structure comprises at least one of the following:
   a hierarchical data structure; and
   a relational database comprising at least one database table having rows representing records of parts of the source code and columns representing fields representing attributes of the parts of the source code.

14. The method of claim 13, where one or more fields of the data structure has more than one data type.

15. The method of claim 13, further including storing version information for tracking a history of changes over time in at least one field of the data structure.

16. The method of claim 1, where processing the attributes and events includes interpreting the attributes and events into a natural language.

17. The method of claim 16, further including storing the interpretation of the attributes and events in the data structure.

18. The method of claim 1, further including integrating the steps of claim 23 with a static code translator.

19. The method of claim 1, the attribute-collecting-and-populating sensor objects transmitting information to a central system that translates and stores the attribute and event information to the data structure.

20. The method of claim 19, further including configuring which attributes and events to interpret and store in the data structure using a user interface of the central system.

21. The method of claim 20, further including configuring the attribute-collecting-and-populating sensor objects to collect only certain types of attributes and events using the user interface of the central system.

22. A system that facilitates automated documentation of source code by documenting attributes and events of the source code of a computer application as a result of the source code being interpreted by an interpretive framework engine in which the computer application is based, the system comprising:
   a processor; and
   a memory having computer readable instructions stored therein that said processor executes and as a result of executing the instructions the processor implements the following steps:
      interjecting attribute-collecting-and-populating sensor objects into a software framework of said source code;
      while traversing the software framework as the source code is being interpreted by an interpretive framework engine that translates the source code into an interactive computer application, said sensor objects collecting data in the source code that represents the attributes and events of the source code that is changing in response to execution by the interpretive framework engine;
      processing the collected attributes and events;
      storing the processed attributes and events in a data structure; and
      generating documentation of the computer application from said stored attributes and events.

23. The system of claim 22, where the computer readable instructions are part of the interpretive framework engine.

24. The system of claim 22, where the computer readable instructions are linked to the interpretive framework engine from an object outside the interpretive framework engine.

25. The system of claim 22, where the collecting of attributes and events of the source code while the source code is being interpreted by said interpretive framework engine includes bypassing programmed conditional logic in the source code.

26. The system of claim 22, where the attributes and events include attributes and events of software framework component objects that represent aspects of the source code.

27. The system of claim 22, where the attribute-collecting-and-populating sensor objects populate the data structure with the collected data.

28. The system of claim 22, where the source code includes extensible markup language and the attribute-collecting-and-populating sensor objects collect data representing the attributes at each node of the extensible markup language.

29. The system of claim 28, where the attribute-collecting-and-populating sensor objects collect the data representing the attributes before and after a particular process is performed on each respective node of the extensible markup language.

30. The system of claim 22, where the attribute-collecting-and-populating sensor objects are visitor objects of a visitor class.

31. The system of claim 30, where the visitor objects further provide event-driven functionality similar to an event-driven object.

32. The system of claim 22, where the attribute-collecting-and-populating sensor objects are event-driven objects of an event-driven class.

33. The system of claim 22, where the attribute-collecting-and-populating sensor objects are a combination of a visitor object of a visitor class and an event-driven object of an event-driven class.

34. The system of claim 22, where the data structure comprises at least one of the following:
    a hierarchical data structure; and
    a relational database comprising at least one database table having rows representing records of parts of the source code and columns representing fields representing attributes of the parts of the source code.

35. The system of claim 34, where one or more fields of the data structure has more than one data type.

36. The system of claim 34, where at least one field of the data structure is used to store version information for tracking a history of changes over time.

37. The system of claim 22, where processing the attributes and events includes interpreting the attributes and events into a natural language.

38. The system of claim 37, where the interpretation of the attributes and events is stored in the data structure.

39. The system of claim 22, where the system is integrated with a static code translator.

40. The system of claim 1, where the attribute-collecting-and-populating sensor objects transmit information to a central system that translates and stores the attribute and event information to the data structure.

41. The system of claim 40, where the central system comprises a user interface to configure which attributes and events to interpret and store in the data structure.

42. The system of claim 41, where the user interface configures the attribute-collecting-and-populating sensor objects to collect only certain types of attributes and events.

43. A non-transitory computer readable storage medium having instructions stored thereon that when executed by a processor cause said processor to implement method for automated documentation of a computer application, the method comprising the steps of:
    interjecting attribute-collecting-and-populating sensor objects into said source code;
    while traversing the source code as the source code is being interpreted by an interpretive framework engine that translates the source code into an interactive computer application, said sensor objects collecting data in the source code that represents the attributes and events of the source code;
    processing the collected attributes and events;
    storing the processed attributes and events in a data structure; and
    generating documentation of the computer application from said stored attributes and events.

* * * * *